Jan. 23, 1945.                W. W. WARNER                2,367,982
                           QUICK REVERSING MOTOR
                          Filed March 9, 1944        2 Sheets-Sheet 1
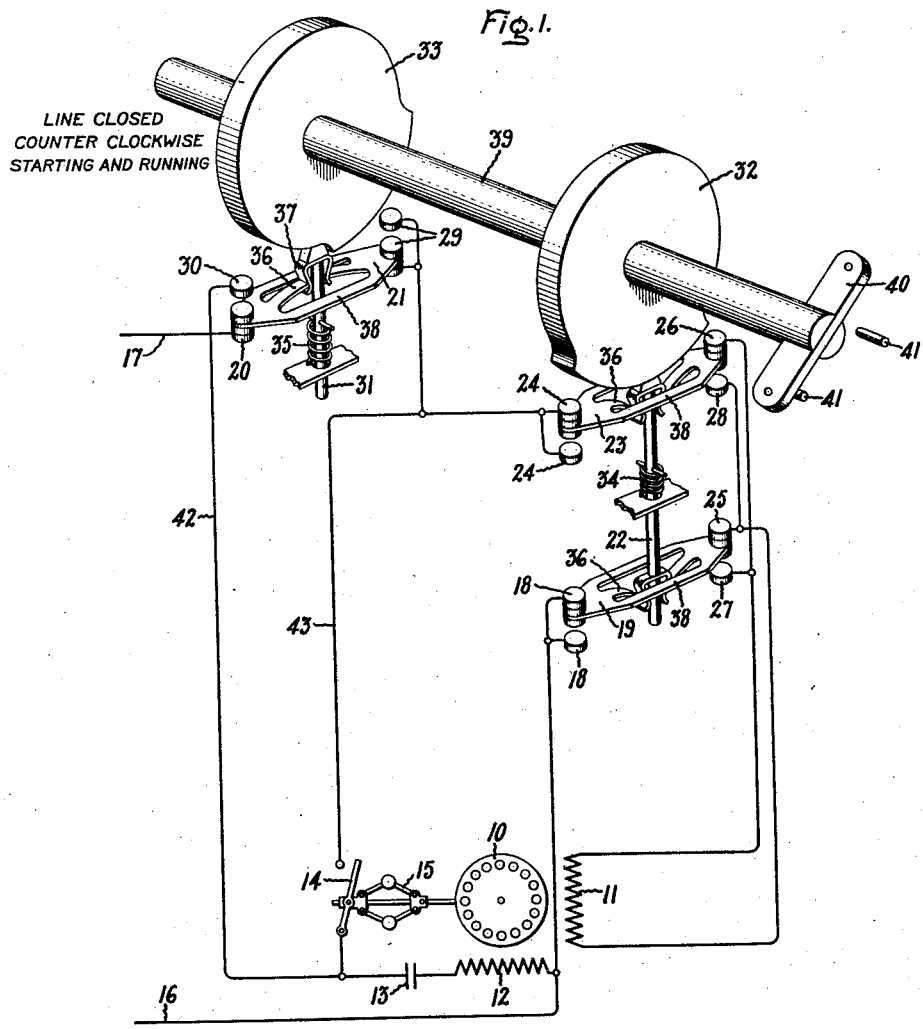
Inventor:
Wilbur W. Warner,
by Harry E. Dunham
His Attorney.

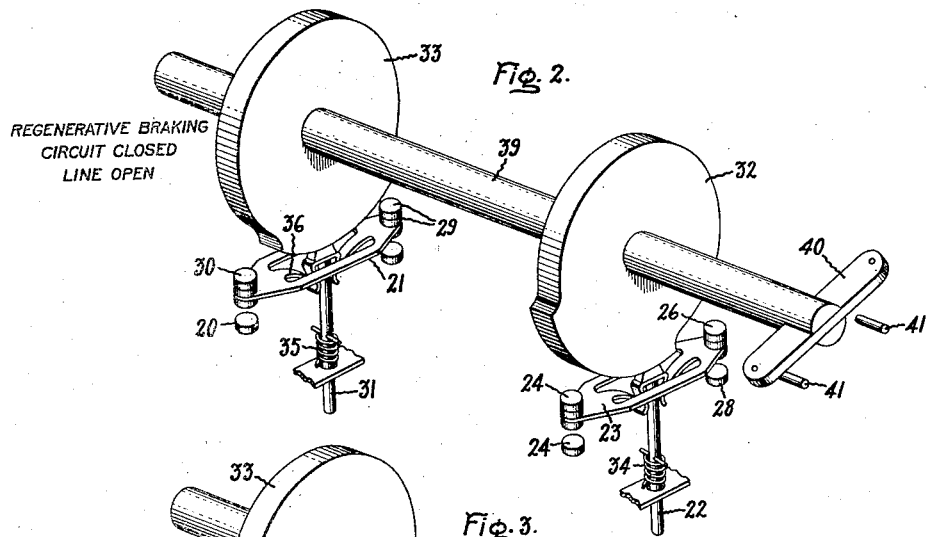
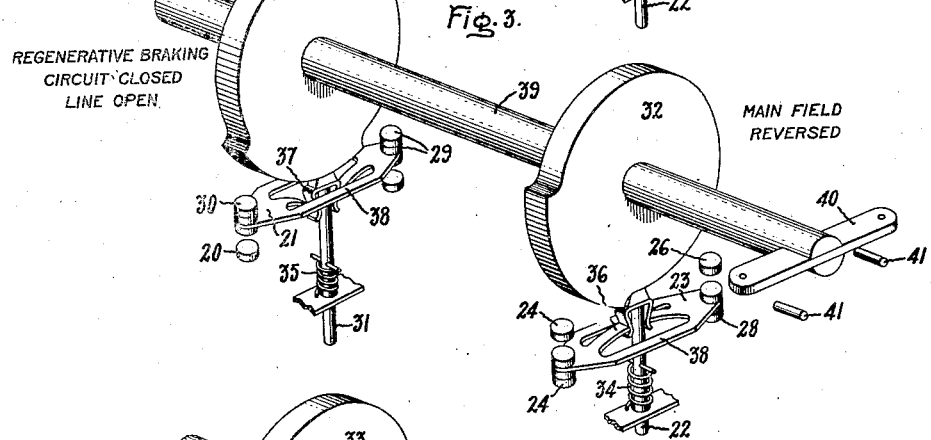
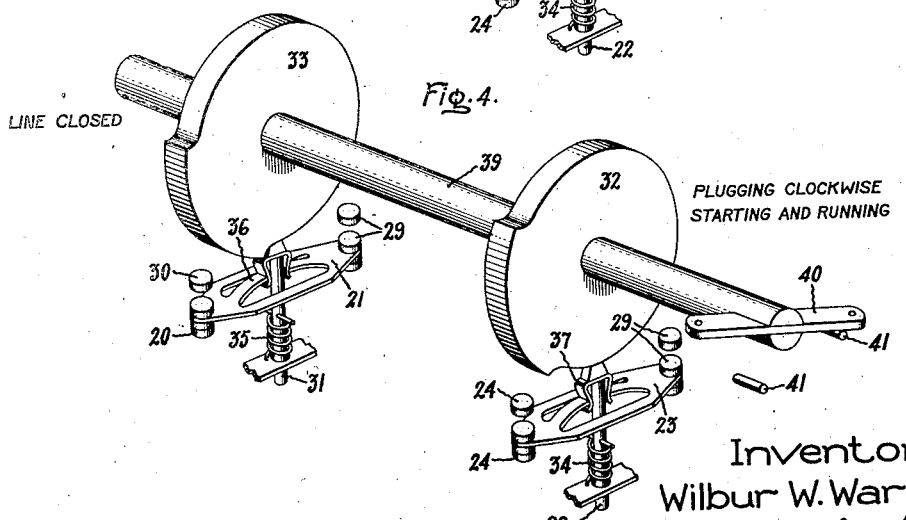

Patented Jan. 23, 1945

2,367,982

UNITED STATES PATENT OFFICE 2,367,982

QUICK REVERSING MOTOR

Wilbur W. Warner, Fort Wayne, Ind., assignor to General Electric Company, a corporation of New York Application March 9, 1944, Serial No. 525,695

4 Claims. (Cl. 172—279)

My invention relates to quick reversing capacitor, split-phase, alternating current motors using dynamic braking during a reversing operation, and an important object of my invention is to provide manual switching apparatus which will perform the necessary switching operations in proper sequence without the aid of relays. This is accomplished by using coordinated switches, preferably of the snap or quick acting type.

The features of my invention which are believed to be novel and patentable will be pointed out in the claims appended hereto. For a better understanding of my invention, reference is made in the following description to the accompanying drawings in which Fig. 1 illustrates a capacitor motor connected for operation through double throw snap action switches, the switches being shown in motor running positions for one direction of rotation; Fig. 2 represents the switches in line open, regenerative braking circuit condition; Fig. 3 represents the condition of Fig. 2, except with the main field reversed; and Fig. 4 represents the switch condition for the opposite direction of motor operation.

Referring to Fig. 1, 10 represents the squirrel-cage rotor of a split-phase capacitor start motor having the quadrature displaced stator main winding 11 and start winding 12. A capacitor 13 is included in the starting winding circuit which circuit is arranged to be opened by an automatic switch 14, represented as the type operated by a centrifugal device 15 driven by the motor, as the motor comes up to speed. The source of single alternating current supply for the motor is applied to line terminals 16 and 17, line terminal 16 being connected directly to one end of the start winding 12 and to the stationary contacts 18 of the lower right-hand switch having the snap action blade 19. The line terminal 17 connects to the lower stationary contact 20 of the left-hand switch having the snap action blade 21. Mounted on the push rod 22 with the previously mentioned switch blade 19 is a third snap action switch blade 23, and, since the blades 19 and 23 are mounted on the same push rod 22, these switches are operated substantially simultaneously. The switch blades 19 and 23 and the stationary contacts associated therewith comprise the reversing switch for the main winding 11. The upper blade 23 cooperates with stationary contacts 24 on the left through which connection is made to the main winding 11 from line terminal 17 through the switch blade 21, when the latter is in the lower position shown. Switch blades 19 and 23 cooperate with upper contacts 25 and 26 respectively on the right, which are connected to opposite ends of the main winding for one direction of energization, and these same switch blades cooperate with lower contacts 27 and 28, respectively, on the right, also connected to opposite ends of the main winding for energizing the main winding in the opposite direction. Thus contacts 25 and 28 are connected together to one end of the main winding, and contacts 26 and 27 are connected together to the other end of the main winding.

The switch blade 21 has parallel connected upper and lower stationary contacts 29 on the right, and when in the lower position shown in Fig. 1 serves as a line switch with respect to supply line 17 for the main winding 11, and when the centrifugal speed responsive switch 14 is closed, for the start winding 12 also. When switch blade 21 is in the upper position, it connects upper contact 29 with the upper left contact 30 to establish a series connection of the start and main windings through condenser 13 for dynamic braking purposes. This connection is independent of the speed responsive switch 14. Switch blade 21 is also mounted on a push rod 31, and the push rods 22 and 31 are biased upwardly against cams 32 and 33 by springs 34 and 35 compressed between stationary abutments and projections on the push rods. Each of the switch blades has a pair of resilient fingers 36 extending toward the push rods from opposite sides, and these are pivotally engaged in recesses formed by bent strap members 37 secured to the push rods. The construction clearly shown in the drawings is such as to form a snap action toggle for the switch blades which have resilient connecting side sections 38 on either side of the push rods. Thus, when the push rod 31, Fig. 1, is moved downward, the fingers 36 of switch 21 are moved downward under compression forces past dead center, whereupon the switch snaps from the lower contacts to the upper contacts substantially instantaneously.

The cams 32 and 33 are mounted on a common shaft 39 so as to be turned simultaneously, and the surfaces of the cams are so shaped as to perform the several switch operations in a desired sequence as the shaft is turned, by any suitable operating means represented by the operating handle 40. There are four different operating positions for the cam operated switch mechanism, one of which is shown in Fig. 1, and others of which are shown in Figs. 2, 3, and 4. In the latter figures the lower switch 19 has been omitted.

It is evident from the connections shown in Fig. 1 that the motor is connected for "up to speed" single-phase operation on the main winding alone, and for purposes of explanation this will be assumed as the counterclockwise running position of the switch mechanism. To reverse the motor, cam shaft 39 is turned clockwise from the position shown in Fig. 1 first to the position shown in Fig. 2. In the position of Fig. 2 the main winding reversing switch remains unchanged but switch 21 has moved to the upper contacts to open the line connection and to establish a braking circuit where the main and start windings are disconnected from line 17 and connected in series with the condenser 13. This causes quick dynamic braking deceleration of the motor, allowing the speed responsive switch 14 to close. A further movement of cam shaft 39 in the clockwise direction causes the main field winding 11 to be reversed by reason of switches 19 and 23 moving to the lower contacts which is the switch position represented in Fig. 3. Further movement of cam shaft 39 in the clockwise direction produces the clockwise starting condition represented in Fig. 4, where the switch 36 has moved to the lower contacts to interrupt the dynamic braking circuit and connect the motor to line 17. The switch 14 now being closed, the motor starts in the clockwise direction and comes up to speed during which time the centrifugal switch 14 opens and the motor then runs single-phase in the clockwise direction.

I have found that the usual capacitor motor will produce what is here termed dynamic braking regardless of the direction of rotation relative to the direction in which the main field winding is connected and if in moving from the switch position of Fig. 1 to the switch position of Fig. 3 the movement is made quickly, dynamic braking will occur although the main field winding is reversed in the meantime, and dynamic braking will continue after the motor speed has been reduced below the point where the speed responsive switch 14 closes. Hence, it is relatively immaterial whether the operator switches quickly or relatively slowly from the condition of Fig. 1 to that of Fig. 3 in order to obtain dynamic braking. Also, as soon as the speed responsive switch closes during deceleration, the motor may be plugged by moving the switching mechanism from the position of Fig. 3 to that of Fig. 4 before the motor has come to rest. The reversing of the motor from clockwise operation to counter-clockwise operation proceeds in the same manner by simply reversing the direction of rotation of the cam shaft 39. It is important to the operation that a reversing switch be used which cannot stay in open position but is closed in one or the other direction for every position of the operating cams.

It will be noted that when the raised portion of the cam 33 is opposite push rod 31, the motor line circuit at contact 20 is open and any time it is desired to stop the motor without reversing, the switch mechanism may be left in such "line open" condition. The motor may then be started in either direction of rotation, clockwise by rotating the cam shaft clockwise, and counterclockwise by rotating the cam shaft counterclockwise. If desired, stops 41 may be provided as shown in Fig. 1 to limit the movement of the cam shaft to the range of operation herein described.

It is seen from the foregoing description that the switch operating coordinating cam arrangement is movable in opposite directions over a range of movement which may be considered as divided into 1st, 2nd, 3rd, and 4th consecutive portions. In the 1st and 2nd portions the cam 32 positions the main field winding reversing switch for one direction of motor operation and in the 3rd and 4th range portions for the opposite direction of motor operation. Cam 33 positions the other switch 21 so as to connect the motor to its source of supply during the 1st and 4th range portions and connects the motor windings in series with the condenser independently of the speed responsive switch during the 2nd and 3rd range portions. This interlocked overlapping operating arrangement of the switches results in the four switch operating conditions described.

The same switch mechanism may be used without the dynamic braking feature by disconnecting the connection 42 or using a motor which does not develop dynamic braking action as for example the resistance split-phase motor. Additional capacity for starting purposes may be included in the starting winding circuit at 43 if desired.

When the control is used for overhead crane operation controlled from the floor, the switch may also be mounted overhead and operated by ropes tied into the openings shown in the two ends of the handle 40. The details of the switches and coordinated operating means may be varied as conditions require.

What I claim as new and desire to secure by Letters Patent of the United States, is:

1. A split-phase motor having quadrature displaced main and start windings, a condenser in series with the start winding, means responsive to the speed of the motor for opening and closing the starting winding circuit as the motor comes up to and decelerates from running speed respectively, a source of single-phase supply for the motor, a snap action reversing switch for the main winding, another snap action switch having one position for connecting the motor to its source of supply and another position where said connection is interrupted and the main and start windings are connected in series with the condenser through the reversing switch and independently of the speed responsive means for establishing a dynamic braking circuit, and common operating means for said switches movable in opposite directions over an operating range divided into 1st, 2nd, 3rd, and 4th consecutive portions, said means positioning the reversing switch for one direction of motor operation over the 1st and 2nd range portions and for the opposite direction of rotation over the 3rd and 4th range portions, and positioning said other switch for connecting the motor to its source of supply over the 1st and 4th range portions and for establishing the dynamic braking circuit over the 2nd and 3rd range portions.

2. A split-phase motor having quadrature displaced main and start windings, a condenser in series with the starting winding, speed responsive means for opening the starting winding circuit as the motor comes up to speed, a source of supply for the motor, a reversing switch for the main winding, another switch for alternately connecting said motor to its source of supply and connecting the main and starting windings in series with the condenser in a dynamic braking circuit independently of the speed responsive means, and means for coordinating the operation of said switches movable in opposite directions over a range of movement divided into 1st, 2nd, 3rd, and 4th consecutive operating range portions, said means positioning said reversing switch for one direction of motor operation over the 1st and 2nd range portions, and for the opposite direction of motor operation over the 3rd and 4th range portions and positioning said other switch for connecting said motor to its source of supply over the 1st and 4th range portions and for connecting the motor windings and condenser in series in the dynamic braking circuit over the 2nd and 3rd range portions.

3. A split-phase motor having quadrature displaced main and start windings, a condenser permanently connected in series relation with the start winding, speed responsive circuit control means for opening the starting winding circuit as the motor comes up to speed, a two-pole snap action reversing switch for the main winding, line terminals, one line terminal being connected to one end of the start winding and to one pole of said reversing switch, another snap action switch having a 1st position where it connects the other line terminal to the other pole of the reversing switch and to the starting winding circuit through said speed responsive circuit control means when the latter is closed, and a 2nd position where the main and start windings are connected in series with the condenser through the reversing switch independently of the speed responsive circuit control means, and operating means for said switches movable in opposite directions over a range of movement such that in one extreme position the motor is connected for one direction of rotation and in moving to the other extreme position the switches are operated in the following order, said other snap action switch is moved from the 1st position to the second position, the reversing switch is operated to reverse the main winding, and finally said other snap action switch is moved from said second position to said first position.

4. A split-phase motor having quadrature displaced main and start windings, a condenser permanently connected in series relation with the start winding, speed responsive circuit control means for opening the starting winding circuit as the motor comes up to speed, a source of single-phase supply, manually operated switching means and connections between said switching means, source of supply, and motor, said manually operated switching means including a snap action reversing switch for the main winding and having a reversible range of movement in which movement in one direction over its range changes the motor connections from those for operating the motor from the source of supply in one direction of rotation, 1st to a dynamic braking connection with the main and start windings connected in series with the condenser independently of the speed responsive switch and with the connection to the source of supply interrupted, 2nd the same connection but with the main winding reversed, and finally to connections for operating the motor in the reverse direction of operation from the source of supply.

WILBUR W. WARNER.